(12) United States Patent
Baumgaertner et al.

(10) Patent No.: US 11,787,502 B2
(45) Date of Patent: Oct. 17, 2023

(54) METHOD FOR CONTROLLING AN ELECTRIC MOTOR OF AN ELECTRIC BICYCLE FOR DRIVING THE ELECTRIC BICYCLE, CONTROL UNIT AND ELECTRIC BICYCLE

(71) Applicant: Robert Bosch GmbH, Stuttgart (DE)

(72) Inventors: Daniel Baumgaertner, Tuebingen (DE); Jana Maria Ickenroth, Reutlingen (DE); Matthias Weinmann, Balingen (DE); Tim Dackermann, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 206 days.

(21) Appl. No.: 17/108,828

(22) Filed: Dec. 1, 2020

(65) Prior Publication Data
US 2021/0171154 A1 Jun. 10, 2021

(30) Foreign Application Priority Data

Dec. 9, 2019 (DE) .......................... 102019219164.9
Jan. 15, 2020 (DE) .......................... 102020200432.3

(51) Int. Cl.
*B62M 6/50* (2010.01)
*B60L 50/20* (2019.01)

(52) U.S. Cl.
CPC ............... *B62M 6/50* (2013.01); *B60L 50/20* (2019.02); *B60L 2200/12* (2013.01); *B60L 2240/16* (2013.01); *B60L 2240/423* (2013.01); *B60L 2250/26* (2013.01)

(58) Field of Classification Search
CPC ....... B62M 6/50; B62M 6/55; B60L 2240/16; B60L 2240/423; B60L 2250/26; B60L 2200/12; B60L 50/20
See application file for complete search history.

(56) References Cited

U.S. PATENT DOCUMENTS

| | | | |
|---|---|---|---|
| 2017/0050700 A1* | 2/2017 | Lemmens | ................ B62M 6/45 |
| 2018/0086417 A1* | 3/2018 | Baumgaertner | ......... B62M 6/50 |
| 2019/0291812 A1 | 9/2019 | Tsuchizawa et al. | |
| 2019/0299797 A1 | 10/2019 | Hasumi | |
| 2019/0308512 A1 | 10/2019 | Hasumi | |
| 2019/0315431 A1* | 10/2019 | Vijaya Kumar | ......... B62M 6/45 |

FOREIGN PATENT DOCUMENTS

| | | |
|---|---|---|
| DE | 102010017742 A1 | 1/2012 |
| DE | 102012220011 A1 | 5/2014 |
| DE | 102016213691 A1 | 2/2018 |
| DE | 102016218374 B3 | 2/2018 |
| DE | 102018219385 A1 | 6/2019 |
| EP | 2931550 B1 | 8/2018 |

* cited by examiner

*Primary Examiner* — Tyler J Lee
*Assistant Examiner* — Yufeng Zhang
(74) *Attorney, Agent, or Firm* — NORTON ROSE FULBRIGHT US LLP; Gerard Messina

(57) ABSTRACT

A method for controlling an electric motor of an electric bicycle for driving the electric bicycle. The method includes: detecting a longitudinal acceleration of the electric bicycle in the direction of the longitudinal axis of the electric bicycle; and generating a motor torque with the aid of the electric motor as a function of the detected longitudinal acceleration, the motor torque being adapted until a predefined setpoint acceleration is reached or exceeded or undershot.

11 Claims, 3 Drawing Sheets

METHOD FOR CONTROLLING AN ELECTRIC MOTOR OF AN ELECTRIC BICYCLE FOR DRIVING THE ELECTRIC BICYCLE, CONTROL UNIT AND ELECTRIC BICYCLE

CROSS REFERENCE

The present application claims the benefit under 35 U.S.C. § 119 of German Patent Application Nos. DE 102019219164.9 filed on Dec. 9, 2019, and DE 102020200432.3 filed on Jan. 15, 2020, which are both expressly incorporated herein by reference in their entireties.

BRIEF SUMMARY

The present invention relates to a method for controlling an electric motor of an electric bicycle for driving the electric bicycle, a motor torque being generated with the aid of the electric motor as a function of an ascertained longitudinal acceleration. The present invention furthermore relates to a control unit which is configured to carry out the control method according to the present invention. The present invention also relates to an electric bicycle including this control unit.

BACKGROUND INFORMATION

European Patent No. EP 2 931 550 B1 describes a method for the total mass determination of an electrically drivable vehicle, a portion of the drive torque being provided by a driver. In this method, a determination of a total mass is carried out at a certain drive torque of the driver of 0 Nm.

A method for activating an electric motor of a vehicle is described in German Patent Application No. DE 10 2010 017 742 A1.

In the case of a changed mass of at least a portion of an electric bicycle, or in the case of a changed total mass of the electric bicycle, a changed acceleration of the electric vehicle results, in the related art, with the same driver torque. For example, with the same driver torque for a cargo bike as the electric bicycle, a higher acceleration of the cargo bike results prior to loading than after loading the cargo bike with a heavy payload. In other words, a non-typical and/or undesirable acceleration behavior of the electric bicycle results in the case of a changed total mass of the electric bicycle.

The acceleration of the electric bicycle may also vary due to a changed friction of rotating components of the drive train, such as different tire types and/or worn or different bearings of the axles or shafts of the drive train, for example, or changing surroundings conditions, such as with increasing headwind and/or as a function of a ground of the route, for example in the case of cobblestones, and/or when driving on an uphill grade of a route.

It is an object of the present invention to improve a driving behavior of an electric bicycle, for example in the case of a changed total mass of the electric bicycle and/or in the case of changed friction coefficients of the drive train of the electric bicycle and/or in the case of changed surroundings conditions.

SUMMARY

The above object may achieved according to example embodiments of the present invention.

The present invention relates to a method for controlling or regulating an electric motor of an electric bicycle for driving the electric bicycle. The electric bicycle is, in particular, an electrical power-assisted cargo bike. Such a cargo bike is advantageously configured to transport larger payloads on a transport surface, for example at least one child and/or heavy purchases and/or beverage crates. In an example embodiment of the present invention, in one method step, a longitudinal acceleration of the electric bicycle in the direction of the longitudinal axis of the electric bicycle is detected. This detection takes place, in particular, with the aid of an acceleration sensor or an inertial sensor unit. In a subsequent step, a motor torque is generated or adapted with the aid of the electric motor as a function of the detected longitudinal acceleration of the electric bicycle, the motor torque being adapted until a predefined setpoint acceleration has been reached or exceeded or undershot, in particular, the adaptation taking place during or in a predefined time period. The method advantageously results in a longitudinal acceleration of the electric bicycle which is essentially independent of the total mass of the electric bicycle, of friction coefficients of the drive train and/or of changing surroundings conditions. The method furthermore results in the advantage that the electric bicycle is accelerated with a predefined setpoint acceleration which is known to the user, with the same pedaling force of the user. In other words, the generated motor torque is advantageously adapted to the instantaneous total mass of the electric bicycle, to the instantaneous friction coefficients of the drive train and/or to changing surroundings conditions or the detected longitudinal acceleration, thereby resulting in a predefined setpoint acceleration of the electric bicycle, in particular after the predefined time period, with the same pedaling force of the user. It may advantageously be provided that the predefined time period is adapted as a function of an uphill grade of the route and/or as a function of an input of the user. Advantageously, a predefined setpoint acceleration value exists in each case for a pushing aid operating mode, and for different assistance situations selectable by the input of the user. The predefined setpoint acceleration values of the pushing aid operating mode and/or of the particular desired assistance situation may advantageously differ from one another. For example, the method has a first predefined setpoint acceleration for a first assistance situation, a second predefined setpoint acceleration for a second assistance situation and/or a third predefined setpoint acceleration for a third assistance situation and/or a further predefined setpoint acceleration for the pushing aid operating mode.

In a preferred embodiment of the present invention, the motor torque of the electric motor is adapted as soon as the detected longitudinal acceleration drops below a first longitudinal acceleration threshold value and/or exceeds a second longitudinal acceleration threshold value. The method is furthermore preferably only carried out when a detected pedaling force of the user exceeds a pedaling force threshold value and/or a detected pedaling frequency of the user exceeds a pedaling frequency threshold value, by which a desired acceleration phase is identified. The advantage that the acceleration behavior of the electric bicycle is set precisely, and only in driving situations desired by the user, results in the method, a manual acceleration component, based on the pedaling force of the user, also being taken into consideration.

In a further embodiment of the present invention, the control method includes the step of an ascertainment of a mass of at least a portion of the electric bicycle. The ascertained mass, in particular, represents a weight of a payload and/or a weight of a user of the electric bicycle, the electric bicycle being, in particular, a cargo bike. The mass may advantageously be detected or ascertained with the aid of a sensor at a cargo area of the electric bicycle and/or with the aid of a further sensor at a seat of the electric bicycle. The total mass of the electric bicycle may alternatively be ascertained as a function of detected trip variables of the electric bicycle, for example according to European Patent No. EP 2 931 550 B1. In a subsequent step, the motor torque is additionally generated with the aid of the electric motor as a function of the ascertained mass. This embodiment yields the advantage that the generated motor torque or the resulting acceleration behavior is adapted to the particular predefined setpoint acceleration value immediately after a changed total mass of the electric bicycle, in particular a changed mass of a payload.

Particularly preferably a pedaling force of the user is detected in one embodiment. Advantageously, a driver torque at a pedaling axis of the electric bicycle is detected, the driver torque representing the pedaling force. In this embodiment, furthermore an input of the user regarding a desired degree of assistance or regarding a desired assistance situation for the power assistance of the electric bicycle is detected in one step of the method. Thereafter, the generation of the motor torque additionally takes place as a function of the detected pedaling force and as a function of the detected assistance situation, the detected desired assistance situation being adapted as a function of the detected longitudinal acceleration value and/or the first and/or second longitudinal acceleration threshold value(s) being changed as a function of the detected assistance situation or the first and/or second longitudinal acceleration threshold value(s) being changed as a function of the adapted assistance situation. This embodiment advantageously results in a mass-independent, friction coefficient-independent and/or surroundings-independent acceleration of the electric bicycle, with the same pedaling force of the user.

In a further embodiment, an ascertainment of an instantaneous hazard potential takes place as a function of an instantaneous position of the electric bicycle and/or as a function of a camera image recorded with the aid of a camera at the electric bicycle, the hazard potential, in particular, representing an instantaneous weather situation and/or an instantaneous traffic density and/or an instantaneous hazard area in the surroundings of the electric bicycle. It may optionally be provided that an instantaneous position of the electric bicycle is ascertained with the aid of a location sensor situated at the electric bicycle, the location sensor ascertaining the geographical position of the electric bicycle, for example with the aid of a satellite-based navigation system. The ascertained position of the electric bicycle is subsequently transmitted to a server unit. Thereafter, the instantaneous hazard potential is received by the electric bicycle from the server unit as a function of the ascertained geographical position of the electric bicycle, the emission of the position of the electric bicycle and the reception of the instantaneous hazard potential, for example, taking place with the aid of a transceiver unit, in particular with the aid of a mobile communication link. In this embodiment, the generation of the motor torque additionally takes place as a function of the ascertained and/or received instantaneous hazard potential. An absolute value of the generated motor torque is advantageously limited as a function of the ascertained and/or received instantaneous hazard potential. As an alternative or in addition, it may be provided that the assistance situation selected by a detected input of the user for assisting the user and/or the first and/or second longitudinal acceleration threshold value(s) is/are adapted as a function of the ascertained and/or received instantaneous hazard potential. In this embodiment, the acceleration of the electric bicycle may advantageously be adapted to the instantaneous hazard potential, thereby resulting in a safer acceleration behavior or a safer trip of the electric bicycle.

In another embodiment of the present invention, a pedaling frequency of the user is detected. The detection of the pedaling frequency, in particular, takes place at the pedaling axis of the electric bicycle. In this embodiment, the motor torque is additionally generated as a function of the detected pedaling frequency. This results in the advantage that a desired acceleration phase of the electric bicycle is quickly identified as well as the resulting acceleration of the electric bicycle is adapted more precisely and/or more quickly or more dynamically to the desired driving behavior of the user.

In one further embodiment of the present invention, it may optionally furthermore be provided that a pitch angle of the electric bicycle is detected. The pitch angle represents a rotation of the electric bicycle about the transverse axis of the electric bicycle. In this embodiment, the generation of the motor torque additionally takes place as a function of the detected pitch angle. This results in the advantage that the resulting acceleration of the electric bicycle is also adapted to an uphill grade of a route of the electric bicycle. In particular, the absolute value of the motor torque is generated in a steadily increasing manner with increasing pitch angle. As a result of this embodiment of the present invention, the electric bicycle also accelerates in the desired or customary manner, or at least essentially consistently and comprehensibly for the user, with the particular predefined setpoint acceleration for, for example, the selected assistance situation or the pushing aid during an upwardly directed trip of the electric bicycle on an uphill grade of the route.

In another refinement, the control method may encompass the step of an identification of an activation of a pushing aid. This pushing aid operating mode is advantageously activated by a user at steeper inclines or uphill grades of the route. In this refinement, the user advantageously does not exert any pedaling force. In other words, in this refinement the user walks next to the electric bicycle, the user pushing the electric bicycle using a manual pushing force. With the pushing aid activated, in this refinement the user is receiving assistance from the generated motor torque with the pushing of the electric bicycle. In this refinement, the generation of the motor torque is additionally carried out as a function of the identified activation of the pushing aid.

The present invention also relates to a control unit, the control unit being configured to carry out a control method according to the present invention. The control unit advantageously detects the longitudinal acceleration of the electric bicycle or a variable which represents the longitudinal acceleration, with the aid of an acceleration sensor or an inertial measuring unit or sensor unit. Thereafter, the control unit advantageously activates the electric motor for generating the motor torque as a function of the detected longitudinal acceleration. The control for the generation of the motor torque is, in particular, adapted until a predefined setpoint acceleration is reached or exceeded. The control unit is, in particular, part of a drive unit, which furthermore advantageously includes the electric motor.

The present invention furthermore relates to an electric bicycle, including the control unit according to the present invention.

Further advantages are derived from the following description of exemplary embodiments with reference to the figures.

DETAILED DESCRIPTION OF EXAMPLE EMBODIMENTS

Figure 1:
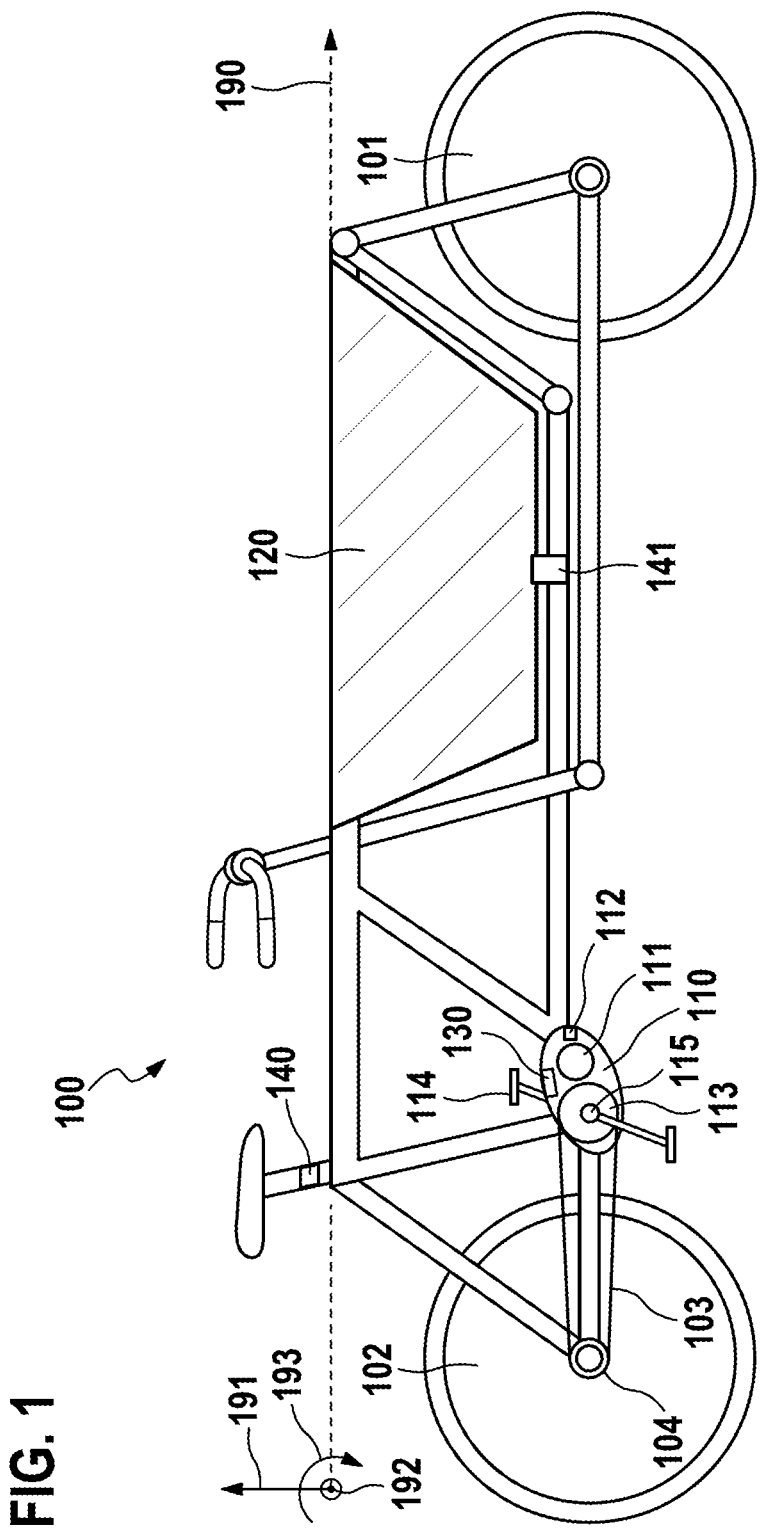
FIG. 1 shows an electric bicycle in accordance with an example embodiment of the present invention.

FIG. 1 shows a cargo bike as an electric bicycle 100, including a front wheel 101 and a rear wheel 102 for driving electric bicycle 100. The cargo bike is steered with the aid of a handle bar and a linkage, which is situated between the handle bar and front wheel 101. The cargo bike furthermore includes a drive unit 110, drive unit 110 including an electric motor 111 and a sensor unit 112, as well as a control unit 130. Control unit 130 is configured to activate electric motor 111. Electric motor 111 is configured to generate a motor torque, which is transmitted with the aid of an output pinion 113, a chain 103 or a belt to a pinion 104 at rear wheel 102 for driving electric bicycle 100 with the aid of rear wheel 102. Using the right and left legs, the user or bicyclist typically generates a respective pedaling force on one of pedals 114, the pedaling force being transmitted with the aid of a respective crank to pedaling axis 115, and with the aid of an output pinion 113 as well as a chain 103 for driving electric bicycle 100 to a sprocket 104 of rear wheel 102. In other words, the user of electric bicycle 101 generates a driver torque to pedaling axis 115, which represents the pedaling force or the pedaling forces of the user, the driver torque being transmitted to output pinion 113, which is connected to pedaling axis 115 or the crankshaft. The driver torque may, for example, be detected with the aid of a torque sensor in drive unit 110 or in the area of pedal axis 115. Electric motor 111 is advantageously activated as a function of the detected driver torque for the generation of a motor torque. In other words, both the driving torque and the motor torque are transmitted with the aid of output pinion 113, chain 103 or the belt to sprocket 104 at rear wheel 102 for driving electric bicycle 100. In this way, the motor torque generated with the aid of electric motor 111 assists the user with driving electric bicycle 100, by which the manual pedaling force of the user onto pedals 114 or the driver torque for accelerating electric bicycle 100 or for maintaining a speed of electric bicycle 100 may be reduced. As an alternative, electric bicycle 100 may also be operated in a pushing aid operating mode, the user advantageously activating or deactivating the pushing aid operating mode or the pushing aid with the aid of a switch at the handle bar of electric bicycle 100. During operation of the pushing aid, a motor torque is generated by electric bicycle 100 with the aid of electric motor 111, which assists the user with pushing electric bicycle 100. During operation of the pushing aid, no pedaling force of the user is necessary for generating the motor torque for driving electric bicycle 100. In other words, in the pushing aid operating mode or during the pushing aid, purely a motor drive of electric bicycle 100 by the generated motor torque takes place, in particular an absolute value of the velocity of electric bicycle 100 not exceeding a maximum value which, in particular, is predefined by law. Sensor unit 112 situated at electric bicycle 100 is, in particular, an inertial measuring unit and configured to detect a longitudinal acceleration of electric bicycle 100 in the direction of longitudinal axis 190 of electric bicycle 100 and/or a transverse acceleration of the electric bicycle in the direction of transverse axis 192 of electric bicycle 100 and/or a vertical acceleration of electric bicycle 100 in the direction of vertical axis 191 of electric bicycle 100. Sensor unit 112 is furthermore configured to detect a pitch angle, the pitch angle representing a rotation 193 of the electric bicycle about transverse axis 192 of the electric bicycle. Electric bicycle 100 furthermore includes an optional weight sensor 140 for detecting the driver weight or for detecting the mass of a bicyclist or a mass of a user of electric bicycle 100. In addition, at least one optional further weight sensor 141 is situated at electric bicycle 100, further weight sensor 141 being configured to detect a mass of a payload of electric bicycle 100. It may be provided that multiple further weight sensors 141 are situated at the cargo bike, as electric bicycle 100, at a transport container 120 of electric bicycle 100. The at least one further weight sensor 141 is configured to detect a mass of the payload of electric bicycle 100 in transport container 120 or a cargo area. For this purpose, transport container 120 is mounted at electric bicycle 100, for example with the aid of further weight sensor 141. In other words, both the mass of the bicyclist may be detected or ascertained with the aid of weight sensor 140 and the mass of the payload in transport container 120 may be detected or ascertained with the aid of weight sensor 141, in the case of electric bicycle 100 shown in FIG. 1, so that the total mass of electric bicycle 100 may be ascertained. For example, children are transported with the aid of the cargo bike, further weight sensor 141 being configured to detect the weight of the children. Weight sensor 140 and/or further weight sensor 141 may advantageously include a pressure sensor.

Figure 2:
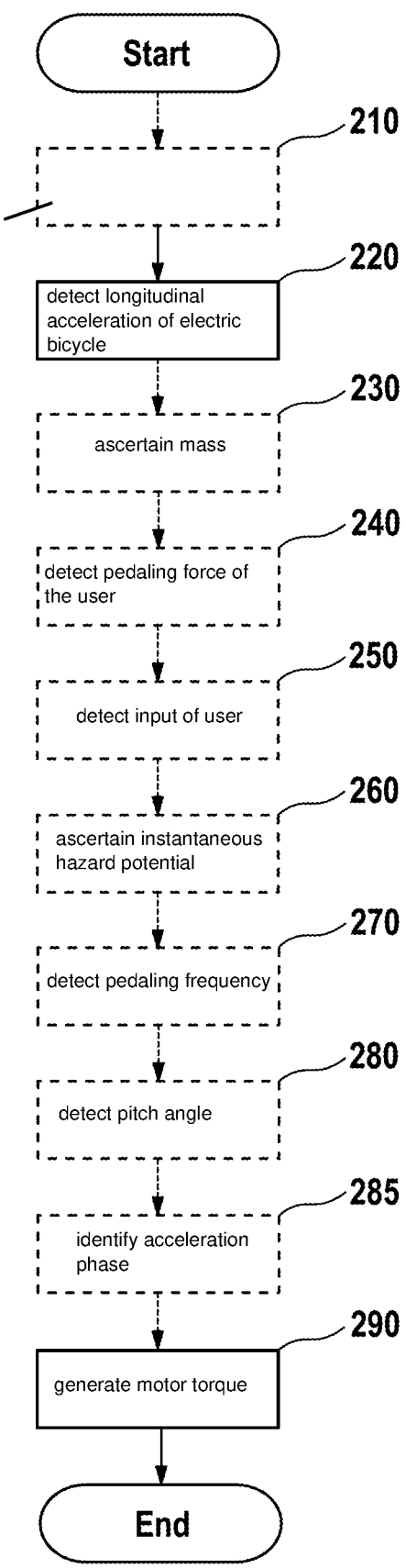
FIG. 2 shows a flowchart of the control method as a block diagram, in accordance with an example embodiment of the present invention.

FIG. 2 shows a flowchart of the control method as a block diagram, in accordance with an example embodiment of the present invention. In a first optional step 210, an identification of an activation of the pushing aid or of a pushing aid operating mode is carried out, for example by detecting an input of the user. For example, identification 210 of the activation of the pushing aid takes place by detecting a switch for activating the pushing aid being depressed by the user, the pushing aid, in particular, being deactivated when the switch is released. In one step 220, a longitudinal acceleration of electric bicycle 100 in the direction of longitudinal axis 190 of electric bicycle 100 is detected. As an alternative or in addition, a mass of at least a portion of the electric bicycle is ascertained or detected in an optional step 230, for example the mass of the bicyclist and/or of a payload of the electric bicycle on a transport surface or in transport container 120. The optional detected or ascertained mass advantageously represents a weight of the payload and/or a weight of the user of electric bicycle 100. In an optional step 240, it may be provided to carry out a detection 240 of a pedaling force of the user. The pedaling force of the user is, in particular, detected as a driver torque at a pedaling axis of the electric bicycle. The detected driver torque thus represents the pedaling force. In optional step 250, furthermore an input of the user regarding a desired assistance situation for power assistance is detected. The desired assistance situation represents a desired motor torque which is to be generated as a function of the pedaling force for assisting the drive of electric bicycle 100. For example, a linear dependence exists between the generated motor torque and the detected pedaling force of the user, the desired assistance situation representing the particular uphill grade of this linear dependence. In other words, the user, in optional step 250, may, for example, select a lower, average or high degree of power assistance by the motor torque generated with the aid of the electric motor. In step 260, it may in addition optionally be provided to ascertain an instantaneous hazard potential as a function of an instantaneous position of the electric bicycle and/or as a function of a camera image recorded with the aid of a camera at the electric bicycle. The instantaneous position of the electric bicycle is, for example, ascertained with the aid of a location sensor for a global positioning system. Optionally or additionally, the hazard potential is ascertained as a function of detected camera data of a camera at the electric bicycle. It may be provided, for example, that a high hazard potential is ascertained, as a function of a detected position of the electric bicycle, in certain surroundings areas, for example at blind road junctions and/or at tight curves of the route. As an alternative or in addition, it may be provided that the hazard potential, in particular, represents an instantaneous weather situation and/or an instantaneous traffic density and/or an instantaneous hazard area in the surroundings of the electric bicycle. In addition, a pedaling frequency of the user is detected in an optional further method step 270. The pedaling frequency of the user is, in particular, detected at the pedaling axis of the electric bicycle. Furthermore, an optional detection 280 of the pitch angle of the electric bicycle may take place. The pitch angle represents a rotation of the electric bicycle about the transverse axis of the electric bicycle or an uphill grade of the route of the electric bicycle and a driving direction of the electric bicycle. Generation 290 of the motor torque is carried out with the aid of the electric motor as a function of the detected longitudinal acceleration of the electric bicycle. In the process, the generated motor torque is, in particular, adapted, in particular increased, until a predefined setpoint acceleration of the electric bicycle is reached or results or is exceeded. Different predefined setpoint accelerations may be provided for different assistance situations. In other words, the motor torque is adapted in step 290, for example, the motor torque being increased until the electric bicycle during the pushing aid or while driving, with the same pedaling force of the user, accelerates essentially independently of the total mass of the electric bicycle, in particular in absolute terms, approximately with the predefined setpoint acceleration. During generation 290 of the motor torque, in particular essentially an acceleration of electric bicycle 100 which is independent of the total mass of the electric bicycle results in this way. Generation 290 or the adaptation of the motor torque may optionally take place as a function of the ascertained mass of the electric bicycle. An acceleration phase desired by the user or bicyclist is advantageously identified in an optional intermediate step 285 of the method as a function of the detected longitudinal acceleration and/or as a function of the detected pedaling force or the detected driver torque and/or as a function of the detected pedaling frequency. Thereafter, in step 290, the motor torque is optionally adapted or generated as a function of the detected longitudinal acceleration and as a function of the identified acceleration phase, in particular only when an acceleration phase is identified in step 285. Generation 290 or the adaptation of the motor torque of the electric motor advantageously takes place as soon as the detected longitudinal acceleration drops below a first longitudinal acceleration threshold value and/or exceeds a second longitudinal acceleration threshold value. In this optional embodiment of step 290, the motor torque is advantageously adapted to the detected longitudinal acceleration with the aid of the first longitudinal acceleration threshold value and the second longitudinal acceleration threshold value, resulting in a particularly mass-independent acceleration behavior of the electric bicycle compared to alternative method sequences, and a generation or an adaptation of the motor torque only taking place during acceleration phases desired by the user. In step 290, the motor torque may optionally additionally be generated or adapted as a function of the detected pedaling force and as a function of the detected assistance situation. In the process, the detected assistance situation is advantageously adapted as a function of the detected longitudinal acceleration. As an alternative or in addition, the first longitudinal acceleration threshold value and/or the second longitudinal acceleration threshold value is/are changed as a function of the detected assistance situation or the adapted assistance situation.

In step 290, it may furthermore optionally be provided that the motor torque is additionally generated or adapted as a function of the ascertained instantaneous hazard potential. In this embodiment, for example, the acceleration of the electric bicycle may be reduced in a mass-independent manner as a function of a weather situation as the instantaneous hazard potential, for example during poor weather, and/or as a function of a traffic situation as the instantaneous hazard potential, for example in the case of high traffic density. In other words, in step 290, the electric bicycle, with the same pedaling force of the user, is optionally accelerated essentially in a mass-independent manner with the aid of the generated motor torque, and additionally as a function of the ascertained instantaneous hazard potential, by which the safety of the user during the trip with the electric bicycle is increased. In step 290, it may furthermore optionally be provided that the motor torque is additionally generated or adapted as a function of the detected pedaling frequency and/or as a function of a detected brake actuation. For example, an acceleration phase or a braking phase or a coasting phase may be identified as a function of the detected pedaling frequency and/or the detected brake actuation, the motor torque subsequently being generated or adapted as a function of the identified acceleration phase or the identified braking phase or the identified coasting phase. In other words, a mass-independent coasting of the electric bicycle or a mass-independent negative acceleration results in this embodiment of the present invention. In step 290, it may furthermore optionally be provided that the motor torque is additionally generated or adapted as a function of the detected pitch angle. The acceleration of the electric bicycle during an upwardly directed trip at an uphill grade of the route is lower in the related art, due to a grade resistance which increases with increasing pitch angle, than the acceleration of the electric bicycle during a downwardly directed trip, or lower than the acceleration of the electric bicycle during a trip on a horizontal route. In other words, a mass-independent and uphill grade-independent acceleration of the electric bicycle results in this embodiment of the present invention, due to the motor torque generated as a function of the pitch angle. In addition, generation 290 of the motor torque optionally additionally takes place as a function of the identified activation of the pushing aid.

Equation 1 shows a drastically simplified linear relationship, adapted for acceleration a, between a constant driving force F, which acts at the circumference of the rear wheel of the electric bicycle and generates a driving torque, and total weight m of the electric bicycle as well as the longitudinal acceleration or acceleration a of the electric bicycle. In other words, with constant driving force F, longitudinal acceleration a of the electric bicycle increases with decreasing total weight of the electric bicycle, and vice versa.

$$a \sim \frac{F}{m} \qquad \text{(equation 1)}$$

In the case of an electric bicycle, driving force F is proportional to driver torque $M_F$ and motor torque $M_M$ generated with the aid of the electric motor; see equation 2. In the case of a constant assistance situation α of the related art, a linear relationship exists between driver torque $M_F$ and the generated motor torque $M_M$. In other words, in the related art, with the same pedaling force or same driver torque $M_F$ and thus constant driving force F, an increasing longitudinal acceleration a of the electric bicycle according to equation 1 results with decreasing total weight of the electric bicycle, and vice versa.

$$F \sim (M_F + M_M) = (M_F + \alpha M_F) = M_F(1+\alpha) \qquad \text{(equation 2)}$$

Generation 290 of the motor torque in the present invention takes place as a function of the detected longitudinal acceleration. The motor torque is optionally generated as a function of the ascertained mass, the ascertained mass, in particular, representing a weight of a payload and/or a weight of a user of the electric bicycle. For the purpose of the generation of a weight-independent or payload-independent acceleration of the electric bicycle, in particular the detected assistance situation α is adapted as a function of the detected longitudinal acceleration and/or as a function of detected mass m, in particular continuously, and in particular until the predefined setpoint acceleration is reached, or undershot or exceeded, as the longitudinal acceleration. Assistance situation α is advantageously additionally adapted as a function of the pitch angle of the electric bicycle, by which a weight-independent and uphill grade-independent longitudinal acceleration of the electric bicycle also results at uphill grades of the route.

Figure 3:
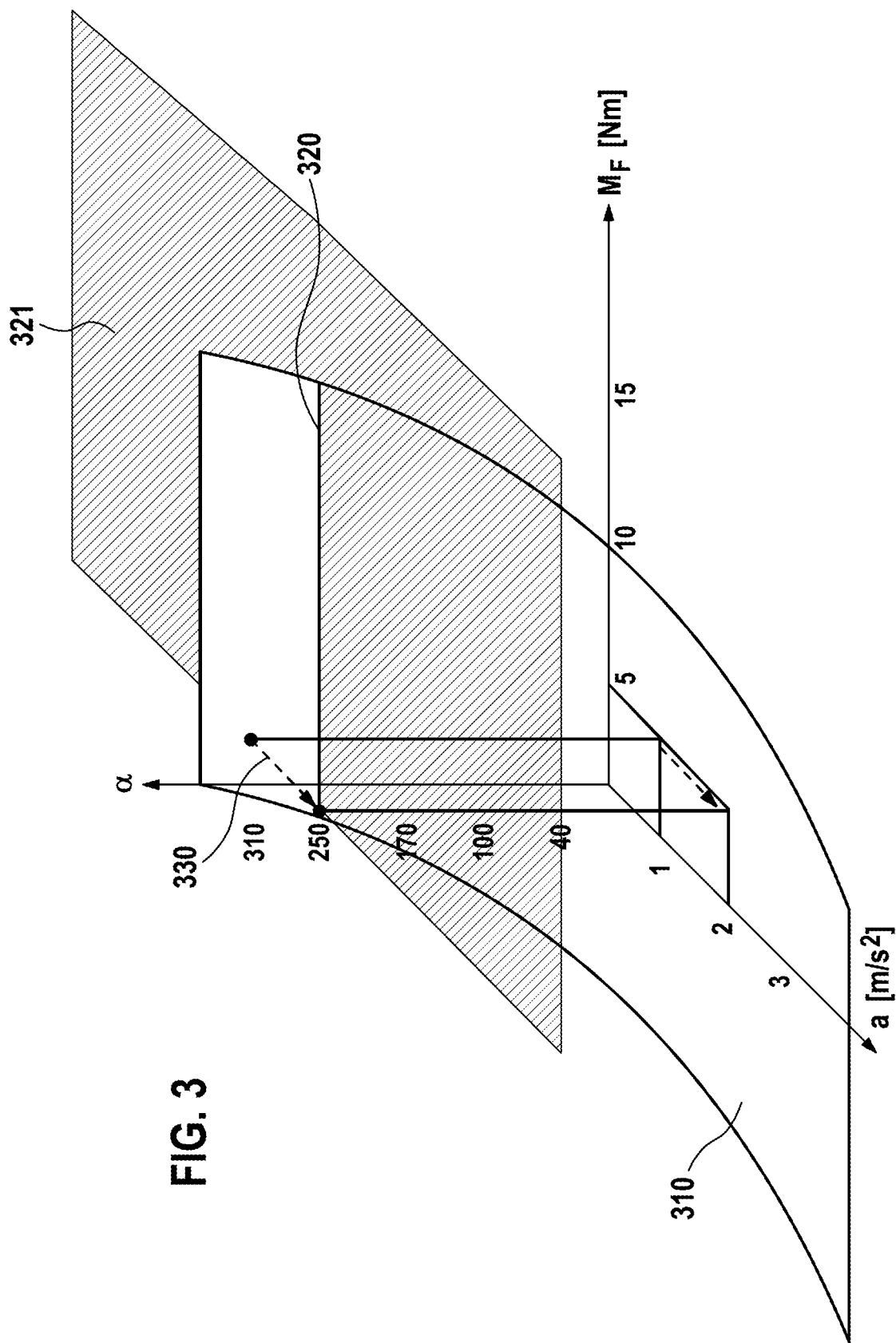
FIG. 3 shows a diagram regarding the dependence of the assistance situation, in accordance with an example embodiment of the present invention.

FIG. 3 shows an example of a three-dimensional diagram regarding the dependence of assistance situation α on detected longitudinal acceleration a and detected driver torque $M_F$, motor torque $M_M$ being generated as a function of assistance situation a. A standard line 320 represents the detected desired assistance situation, which typically results in an acceleration characteristic expected by the user or in the predefined setpoint acceleration. For example, the user selects an assistance situation of 250% by a detected input. The desired assistance situation applies, for example, to all detected driver torques. Standard line 320 extends through the intersecting point of a curved assistance plane 310 with an original assistance plane 321. Original assistance plane 321 visualizes the weight-independent constant assistance situation in the related art, a predefined setpoint acceleration resulting under certain standard conditions, for example on a horizontal paved route with a user having an ideal driver weight. Curved assistance plane 310 visualizes a dependence according to the present invention of the generated motor torque or of the assistance situation on the detected longitudinal acceleration. This is explained hereafter. If, for example, a longitudinal acceleration of a heavily loaded cargo bike as an electric bicycle of 1 m/s² is detected with a detected driver torque of 5 Nm, this acceleration of electric bicycle 100 does not correspond to the acceleration characteristic expected by the user, or the predefined setpoint acceleration of 2 m/s², for the detected desired assistance situation of 250%. According to curved assistance plane 310, the detected desired assistance situation of 250% is consequently adapted to the amount of 310%, as a result of which the absolute value of the generated motor torque is increased, and thus the acceleration or longitudinal acceleration of the electric bicycle is increased or adapted. The user perceives this adapted longitudinal acceleration as being essentially mass-independent. In other words, the progression of the assistance plane 310 represents an adaptation of the driving dynamics or of assistance situation α to varying total masses or different kinds of electric bicycles and/or different payloads. As a result of the detected longitudinal acceleration changing over the course of time, the generated motor torque or assistance situation α is, in particular, continuously varied or adapted, until the predefined setpoint acceleration is reached, or the acceleration process is completed and a velocity of the electric bicycle desired by the user is reached. In other words, the generated motor torque or the assistance situation is incrementally or continuously adapted, in particular, within a predefined time period, until the desired assistance situation of 250%, as detected by the input, results for the user. Within what duration or how quickly a user reaches a desired velocity, or when the phase of the longitudinal acceleration is completed, and at what velocity of the electric bicycle the user is moving on curved assistance plane 310 along path 330 during the trip, or how long the generated motor torque or the assistance situation is adapted, depends on the radius of curvature of assistance plane 310 and driver torque $M_F$. In addition to the method described for FIG. 3, particularly preferably a mass of at least a portion of the electric bicycle is detected or ascertained, and the motor torque is generated as a function of the detected mass, in particular at the beginning of the method or the predefined time period. It may be provided to adapt a radius of curvature of assistance plane 310 as a function of the detected mass of the electric bicycle.

What is claimed is:

1. A method for controlling an electric motor of an electric bicycle for driving the electric bicycle, comprising the following steps:
   detecting a longitudinal acceleration of the electric bicycle in a direction of the longitudinal axis of the electric bicycle;
   detecting a pedaling force of a user of the electric bicycle; and
   generating a motor torque using the electric motor as a function of the detected pedaling force and as a function of an assistance ratio,
   wherein the assistance ratio is a function of the longitudinal acceleration of the electric bicycle such that the assistance ratio is higher for a low value of the longitudinal acceleration than for a high value of the longitudinal acceleration.

2. The method as recited in claim 1, wherein the motor torque of the electric motor is adapted as soon as the detected longitudinal acceleration drops below a first longitudinal acceleration threshold value and/or exceeds a second longitudinal acceleration threshold value.

3. The method as recited in claim 1, further comprising the following steps:
   ascertaining a mass of at least a portion of the electric bicycle; and additionally generating the motor torque as a function of the ascertained mass.

4. The method as recited in claim 3, wherein:
   (i) the detected assistance ratio is adapted as a function of the ascertained mass, and/or (ii) the first longitudinal acceleration threshold value and/or the second longitudinal acceleration threshold value being changed as a function of the assistance ratio.

5. The method as recited in claim 1, further comprising:
ascertaining an instantaneous hazard potential as a function of an instantaneous position of the electric bicycle and/or as a function of a camera image recorded with the aid of a camera at the electric bicycle, the hazard potential representing an instantaneous weather situation and/or an instantaneous traffic density and/or an instantaneous hazard area in surroundings of the electric bicycle;
wherein the generation of the motor torque additionally takes place as a function of the ascertained instantaneous hazard potential.

6. The method as recited in claim 1, further comprising:
detecting a pedaling cadence of a user of the bicycle and/or a detected brake actuation by the use;
wherein the generation of the motor torque additionally takes place as a function of the detected pedaling cadence and/or the detected brake actuation.

7. The method as recited in claim 6, wherein the generation of the motor torque is additionally carried out as a function of a rate of change of the detected pedaling cadence.

8. The method as recited in claim 1, further comprising:
detecting a pitch angle of the electric bicycle, the pitch angle representing a rotation of the electric bicycle about a transverse axis of the electric bicycle;
wherein the generation of the motor torque additionally taking place as a function of the detected pitch angle.

9. The method as recited in claim 1, further comprising:
identifying an activation of a pushing aid;
wherein the generation of the motor torque additionally takes place as a function of the identified activation of the pushing aid.

10. A control unit configured to control an electric motor of an electric bicycle for driving the electric bicycle, the control unit configured to:
detect a longitudinal acceleration of the electric bicycle in a direction of the longitudinal axis of the electric bicycle;
detect a pedaling force of a user of the electric bicycle; and
generate a motor torque using the electric motor as a function of the pedaling force and as a function of an assistance ratio,
wherein the assistance ratio is a function of the longitudinal acceleration of the electric bicycle such that the assistance ratio is higher for a low value of the longitudinal acceleration than for a high value of the longitudinal acceleration.

11. An electric bicycle, comprising:
an electric motor; and
a control unit configured to control the electric motor of the electric bicycle for driving the electric bicycle, the control unit configured to:
detect a longitudinal acceleration of the electric bicycle in a direction of the longitudinal axis of the electric bicycle,
detect a pedaling force of a user of the electric bicycle; and
generate a motor torque using the electric motor as a function of the pedaling force and as a function of an assistance ratio,
wherein the assistance ratio is a function of the longitudinal acceleration of the electric bicycle such that the assistance ratio is higher for a low value of the longitudinal acceleration than for a high value of the longitudinal acceleration.

\* \* \* \* \*